United States Patent
Mason

(10) Patent No.: US 7,003,447 B1
(45) Date of Patent: Feb. 21, 2006

(54) TANDEM AUDIO COMPRESSION

(75) Inventor: Andrew James Mason, Surrey (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 09/787,204

(22) PCT Filed: Sep. 23, 1999

(86) PCT No.: PCT/GB99/03153

§ 371 (c)(1),
(2), (4) Date: Jun. 15, 2001

(87) PCT Pub. No.: WO00/18046

PCT Pub. Date: Mar. 30, 2000

(30) Foreign Application Priority Data

Sep. 23, 1998 (GB) .................................... 9820757

(51) Int. Cl.
*G10L 19/00* (2006.01)
(52) U.S. Cl. .................................... 704/200.1; 704/500
(58) Field of Classification Search ............. 704/200.1, 704/500, 227, 228
See application file for complete search history.

(56) References Cited

U.S. PATENT DOCUMENTS

| 5,185,800 A | * | 2/1993 | Mahieux | 704/500 |
| 6,560,283 B1 | * | 5/2003 | Fletcher | 375/240.1 |

FOREIGN PATENT DOCUMENTS

| GB | 2 321 577 | 7/1998 |
| GB | 2321577 A | 7/1998 |
| WO | WO 95/22858 | 8/1995 |
| WO | WO 95/03017 | 1/1998 |
| WO | WO 98/03017 | 1/1998 |
| WO | WO 98/33284 | 7/1998 |
| WO | WO 99/04571 | 1/1999 |

* cited by examiner

*Primary Examiner*—Tālivaldis Ivars Šmits
*Assistant Examiner*—Dihye Boa
(74) *Attorney, Agent, or Firm*—McDermott Will & Emery LLP

(57) ABSTRACT

In a system in which an auxiliary data signal is conveyed with a decoded audio signal to assist in re-encoding, signature information is provided to assist in detecting changes in the decoded audio signal which would render the auxiliary data signal of little or no use in re-encoding. The signature information is most preferably included in the auxiliary data signal.

16 Claims, 1 Drawing Sheet

TANDEM AUDIO COMPRESSION

Figure 1:
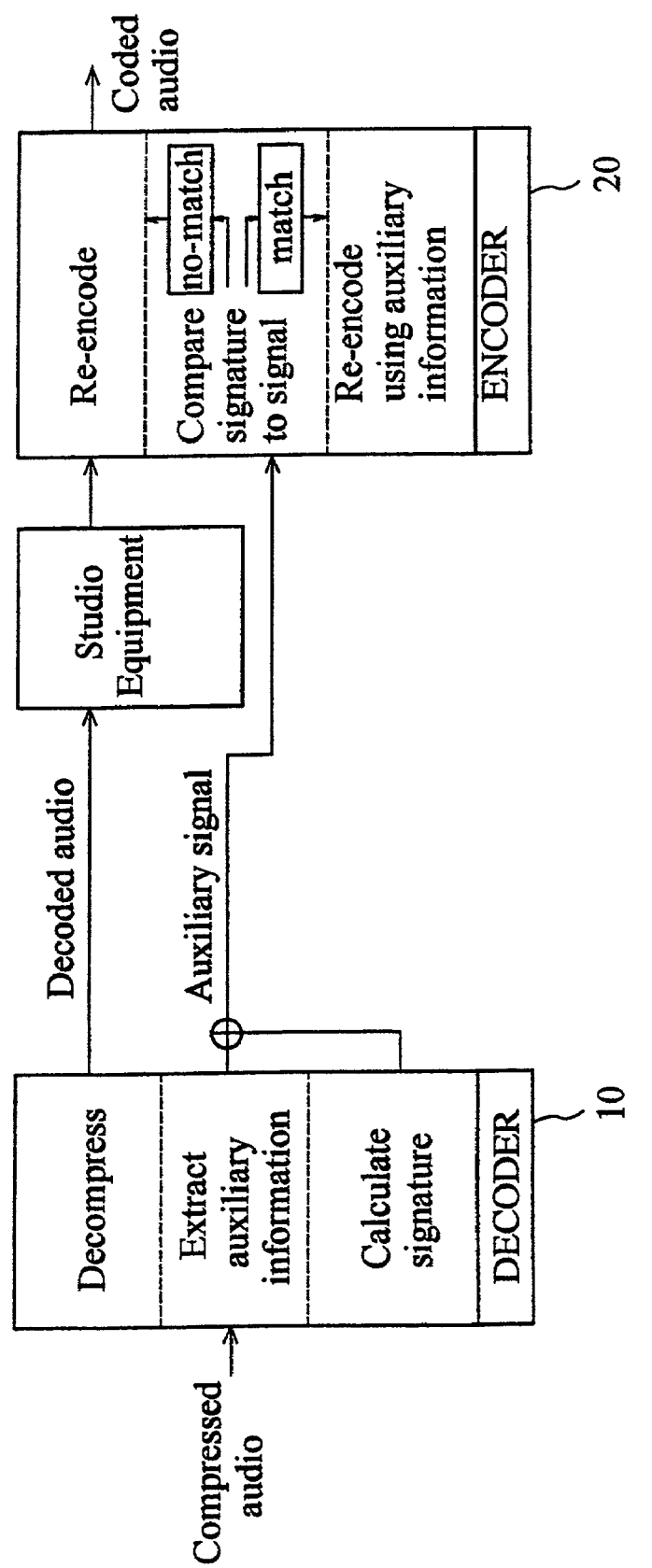

The present invention relates to audio compression, and particularly to decoding and recoding of compressed audio signals.

Earlier British Broadcasting Corporation International Application WO-A-98/33284, the entire disclosure of which is incorporated herein by reference, discloses a method of decoding and recoding digital audio which results in reduced impairment in quality, by communicating an auxiliary signal containing information concerning coding decisions.

A problem can arise, however, that the decoded audio is processed so that the additional information no longer becomes helpful in the recoding process. Our earlier application suggests either disabling the auxiliary data signal in the event of such processing or adding a tell-tale signal to the decoded audio to indicate that such processing has occurred.

Whilst the above system works well, it has been found that an alternative arrangement may offer improved results in certain circumstances.

According to a first aspect, the invention provides a method of audio signal processing comprising providing an auxiliary data signal for communicating with a decoded audio signal, the auxiliary data signal comprising information for use in re-encoding the decoded audio signal, the method further comprising providing signature information representative of the decoded audio signal for use in detecting a change in the decoded audio signal.

In this way, rather than having to identify a tell-tale in the decoded audio, a change in the decoded audio can be automatically detected at the point of recoding by comparing the signature information to the decoded audio. Preferably, the signature information is communicated with the auxiliary data stream. Since the auxiliary data stream must, in any event, be read in order to effect re-encoding based on the auxiliary data stream, this may simplify processing.

The signature information may include a checksum derived from the values of the decoded audio samples. This may enable identification of even very minor changes, and allow maintenance of absolute purity of the audio signal.

Alternatively, the signature information may include statistical information derived from the decoded audio signal, for example mean signal level and, optionally, standard deviation of sample values from the mean. This may enable significant changes in the audio signal to be detected, whilst rendering the system insensitive to minor modifications. Thus, the signature information may contain information enabling significant changes in the audio signal to be detected but minor changes to be ignored. Similarly, the signature information may enable a match, or a partial match, to be detected when the decoded audio signal has undergone a minor change.

The method may further comprise detecting whether the signature information matches the decoded audio, for example by comparing a signature derived from the decoded audio signals to the communicated signature information and detecting whether the difference between the derived and communicated signature exceeds a predetermined threshold. If the signature matches, then the decoded signals can be re-encoded using the auxiliary signal, for example in the manner described in our earlier application WO-A-98/33284. If the signature does not match, the decoded signal can be re-encoded without using the auxiliary data signal, or using only a part of the auxiliary data signal.

The auxiliary signal may be derived together with the signature information from a received compression-encoded audio signal as part of compression decoding of the compression encoded audio signal.

The auxiliary data signal may be selected from the signals described in our earlier application WO-A-98/33284.

Further aspects and preferred features are set out in the claims, to which reference should be made.

An embodiment of the invention will now be described, by way of example, with reference to the accompanying drawings in which FIG. 1 is a schematic diagram of cascaded decoding and re-encoding processes according to a preferred embodiment.

Referring to FIG. 1, a compressed audio signal is passed to a decoder 10 which extracts auxiliary information for use in re-coding the signal and decompresses the signal to produce a decoded audio signal and an auxiliary signal. In the embodiment shown, the decoded audio signal and auxiliary signal are output separately. The decoded audio signal passes through studio equipment which may process the signal and is re-encoded in an encoder 20. The auxiliary signal extracted is passed to the encoder 20 for use in re-encoding.

Thus far, the apparatus may be as described in our earlier WO-A-98/33284, the entire disclosure of which is incorporated herein by reference, with particular reference to FIG. 2 and the related description.

In the embodiment shown, the auxiliary signal is communicated separately from the decoded audio signal. As an alternative, for example as described in WO-A-98/33284, the auxiliary signal may be communicated with the decoded audio signal; one arrangement suitable for achieving this is described with reference to FIG. 3 of WO-A-98133284.

In accordance with the present embodiment, in addition to auxiliary information for use in re-encoding, signature information representative of the decoded audio signal is calculated by the decoder 10 and communicated as part of the auxiliary data signal.

The signature information may comprise, for example, a checksum calculated for individual audio samples or for a predetermined number of audio samples. The provision of a checksum enables accurate verification of faithful reproduction of the audio signal. Alternatively, the signature information may comprise a measure derived from the decoded audio signal, for example a statistical measure such as the mean signal level, and optionally the standard deviation (or other measure, such as variance or the like) of samples from the mean. Provision of statistical or other information may enable minor changes (by which is meant changes which are unlikely to affect coding substantially) to be tolerated while making use of previous coding information. Provision may be made for identifying a partial match based on closeness of match so that some or all information may be used.

The auxiliary signal and the signature signal are preferably conveyed together as a single digital data signal. They can advantageously be conveyed in the user bits of an AES-3 bitstream.

In the encoder 20, the signature information received is compared to a further signature calculated from the decoded audio signal which has been processed by the studio equipment. If the signatures match within a predetermined threshold, re-encoding is performed using the auxiliary information, for example in the manner described in WO-A-98/33284.

If the signatures do not match, re-encoding is performed without reference to the auxiliary signal.

The setting of the threshold within which a match is detected will depend on the nature of the auxiliary signal and also the nature of the signature information. The threshold should be set so that the auxiliary information is used whenever it might assist the re-coding process but discarded when it will not improve the fidelity of the overall cascaded decoding and re-encoding processes.

In certain cases, rather than a "yes/no" comparison, the re-encoding process may be arranged to take some, but not all, of the auxiliary information into account or to modify a "blind" re-encoding process based on the auxiliary information when an imperfect signature match is detected, but not to discard the auxiliary information entirely.

By way of background, we will summarise certain examples of auxiliary information and ways in which it may be carried (as described in WO-A-98/33284).

Examples of signals that could comprise the auxiliary data are:

1. The coded audio signal at the input to the decoder (D1, D2, etc.). This contains not only audio-related data and the PTS but also certain auxiliary information such as programme-associated data (PAD), which may need to be copied into the coded signal at the output from the studio area, and error protection. Depending upon the circumstances, such a signal would enable the coder (C) to substitute the original coded signal for the re-coded PCM signal, or to re-code the PCM signal with blocks of audio data resembling closely the blocks within the original coded signal, as described above. Conveying the coded audio signal to the coder provides the widest range of options for re-coding with minimal additional impairment of the audio.

2. The coded audio samples at the input to the decoder minus the quantised audio samples (which can be re-created identically from the PCM audio signal). This is a signal in which the positions of the frame boundaries of the original coded signal are indicated relative to the linear audio samples in the PCM signal, and from which the positions of the blocks of data within the frames may be deduced, together with information on the allocation of bits to the various components of the coded signal (sometimes known as "bit-allocation data"), scale factors, block lengths (in coding schemes where, this is relevant), the PTS, and any other data relevant to the coding system in use.

3. A signal similar to that described in "2" above, but containing a subset of the information described (e.g. just the positions of the frame boundaries).

As mentioned above, the signature information is preferably carried with the auxiliary data. It may however be carried independently, for example along a dedicated channel.

The following are ways in which the auxiliary data signal might be transported with the PCM audio. The signature information, if not combined with the auxiliary data signal, may be transported along another of these (or other) possible routes. The routes are:

1. In the auxiliary sample bits of the ITU-R Rec. 647 bitstream. At the studio standard sampling frequency of 48 kHz, a total bit rate of 384 kbit/s is available in the auxiliary sample bits of both "X" and "Y" subframes. This method is ideal for conveying the auxiliary data between different items of equipment but there is some uncertainty concerning the way in which studio equipment might treat these auxiliary sample bits. For example, the studio equipment may not route these bits through to the output with the PCM audio, or it may not delay these bits by the same amount as the PCM audio. In either case, some modification of the studio equipment, or of the environment around it, may be necessary.

2. In the least significant bits (l.s.b.) of the PCM audio sample words of the ITU-R Rec. 647 bitstream. The bits can be inserted into active audio or may be additional bits. Depending upon the resolution of the studio equipment these may the same as the auxiliary sample bits (these are the l.s.b if the Rec. 647 signal is configured to carry 24-bit audio sample words) or the least significant bits within the part of the subframe reserved for 20-bit audio sample words (these are the same bits that carry the 20 most significant bits of 24-bit sample words). The data can be carried as the least significant bit of 16 bit audio. Carrying the auxiliary data in the l.s.b. of the audio sample words overcomes the problems of routing within the studio equipment and care will be taken to ensure that the auxiliary data signal is inaudible. The studio equipment needs to be transparent to audio sample words of at least 20 bits. If necessary, the audibility of the auxiliary data signal could be reduced by scrambling (e.g. by the modulo-2 addition of a pseudorandom binary sequence, or the use of a self-synchronising scrambler). Alternatively, it could be removed altogether by truncating the audio sample words to the appropriate length (i.e. to exclude the auxiliary data).

3. In the user data bits of the ITU-R Rec. 647 bitstream. Taking the user data bits from both "X" and "Y" subframes provides a channel with a bit rate of only 96 kbit/s. In many applications this is unlikely to be sufficient to carry the complete coded audio signal. It would be sufficient to signal the positions of frame boundaries, and to carry some other information extracted from the coded audio. With this method there is uncertainty concerning the way in which studio equipment might treat the user data.

4. In the upper part of the audio spectrum, at frequencies higher than those of the audible components of the signal. For this purpose, the PCM audio signal would be low-pass filtered, and the coded auxiliary data signal added above the passband occupied by the audible signal. A particularly ingenious way of doing this, when the studio area is receiving MPEG audio coded signals, would be to use an MPEG analysis subband filterbank with the reciprocal synthesis filterbank at the insertion units. At 48 kHz sampling frequency, the audio passband extends almost up to 24 kHz. In MPEG audio coding this passband is divided into 32 equally-spaced subbands, each with a bandwidth of 750 Hz. The upper five subbands are not used, and the audio is thus effectively low-pass filtered to 20.25 Khz. The auxiliary data could be inserted into the upper subbands, and would be carried in the upper part of the spectrum of the PCM audio signal, to be extracted by another MPEG analysis filterbank at the splitter. The PCM signal applied to the coder would not need further filtering to remove the auxiliary data, as this would happen in the analysis filterbank in the coder itself.

5. The auxiliary signal might be a low-level known pseudo random binary sequence (prbs) added to the audio. The prbs would be synchronised in some way with the audio frame boundaries and may be modulated with additional data where possible. It is also possible to subtract the prbs from the data prior to final transmission or monitoring.

It has been explained that under certain circumstances it is appropriate to perform partial decoding and re-encoding. In the appended claims the terms decoding and re-encoding should be taken as including partial decoding and re-encoding, respectively.

It will be appreciated that there are numerous ways in which the invention can be applied to assist in re-encoding of a previously decoded signal. In particular, it is to be noted that the present invention is not specifically limited to a basic decoding and recoding process as described in WO-A-98/33284, the disclosure of which is provided purely by way of an exemplary system in which the invention may be employed.

Each feature disclosed herein may be provided independently, unless otherwise stated.

I claim:

1. A method of audio signal processing comprising providing an auxiliary data signal for communicating with a decoded audio signal, the auxiliary data signal comprising information for use in re-encoding the decoded audio signal, the method being characterised by providing signature information representative of the decoded audio signal for use in detecting a change in the decoded audio signal, wherein the signature information contains information enabling significant changes in the audio signal to be detected but minor changes which are unlikely to affect coding substantially to be tolerated while making use of information for use in re-encoding contained in the auxiliary data signal.

2. A method according to claim 1, wherein the signature information is included in the auxiliary data signal.

3. A method according to claim 1, wherein the signature information includes a checksum calculated from decoded audio samples.

4. A method according claim 1, wherein the signature information enables a match, or a partial match, between the decoded audio signal and the signature information to be detected when the decoded audio signal has undergone a minor change which is unlikely to affect coding substantially.

5. A method according to claim 1, wherein the signature information includes statistical information derived from the decoded audio signal.

6. A method according to claim 1, wherein the decoded audio signal has a mean signal level and the signature information includes a measure of said mean signal level.

7. A method according to claim 1, wherein the signature information includes a measure of standard deviation of sample values from the mean.

8. A method of re-encoding a decoded audio signal comprising receiving the decoded audio signal, an auxiliary data signal containing information for use in re-encoding the decoded audio signal and re-encoding the decoded audio signal based on re-encoding information contained in the auxiliary data signal, characterised by providing a signature information signal containing signature information representative of the decoded audio signal for use in detecting a change in the decoded audio signal, wherein the signature information contains information enabling significant changes in the audio signal to be detected but minor changes which are unlikely to affect coding substantially to be tolerated while making use of information for use in re-encoding contained in the auxiliary data signal; checking whether the received signature information matches the decoded audio signal; and wherein said re-encoding the decoded audio signal is based on re-encoding information contained in the auxiliary data signal if the signature information matches.

9. A method as claimed in claim 8, wherein the signature information is combined with the auxiliary data signal.

10. A method according to claim 8, wherein checking comprises deriving further signature information from the received audio signal and comparing the derived further signature information to the received signature information.

11. A method according to claim 10, wherein comparing comprises comparing any difference between the derived and received signature information to at least one threshold.

12. A method according to claim 8, wherein all of the auxiliary data signal is used for re-encoding if a perfect or near-perfect match is detected.

13. A method according to claim 9, wherein some of the auxiliary data signal is used for re-encoding if a partial match is detected.

14. Apparatus for decoding a compression encoded audio signal comprising means for decoding the compression encoded audio signal to produce a decoded audio signal; and means for providing an auxiliary data signal containing information for use in re-encoding the decoded audio signal; characterised by means for providing signature information representative of the decoded audio signal for use in detecting a change in the decoded audio signal, wherein the signature information contains information enabling significant changes in the audio signal to be detected but minor changes which are unlikely to affect coding substantially to be tolerated while making use of information for use in re-encoding contained in the auxiliary data signal.

15. Apparatus for re-encoding a decoded audio signal comprising:

means for receiving said decoded audio signal together with auxiliary information for use in re-encoding the signal; and means for re-encoding the decoded audio signal based on the auxiliary information, characterised in that:

the means for receiving is arranged to receive signature information wherein the signature information contains information enabling significant changes in the audio signal to be detected but minor changes which are unlikely to affect coding substantially to be tolerated while making use of information for use in re-encoding contained in the auxiliary data signal, the apparatus further comprising means for checking whether the decoded audio signal matches the signature information; and wherein said means for re-encoding is arranged to re-encode the decoded audio signal based on the auxiliary information if the decoded audio signal matches the signature information.

16. A medium carrying, in combination, a decoded, previously compression encoded, audio signal, an auxiliary data signal comprising information for use in re-encoding the decoded audio signal, and a signature information signal containing signature information representative of the decoded audio signal for use in detecting changes in the decoded audio signal, wherein the signature information contains information enabling significant changes in the audio signal to be detected but minor changes which are unlikely to affect coding substantially to be tolerated while making use of information for use in re-encoding contained in the auxiliary data signal.

* * * * *